US012634352B2

(12) United States Patent
Sarda et al.

(10) Patent No.: US 12,634,352 B2
(45) Date of Patent: May 19, 2026

(54) SEPARATE ACCESS CONTROL FOR MANAGING BASTIONS AND BASTION SESSIONS

(71) Applicant: Oracle International Corporation, Redwood Shores, CA (US)

(72) Inventors: Vineet Sarda, Seattle, WA (US); Srujan Jonnadula, Seattle, WA (US); Jie Yuan, Austin, TX (US); Umesh Ravuru, Acworth, GA (US)

(73) Assignee: Oracle International Corporation, Redwood Shores (CA)

( * ) Notice: Subject to any disclaimer, the term of this patent is extended or adjusted under 35 U.S.C. 154(b) by 51 days.

(21) Appl. No.: 18/781,622

(22) Filed: Jul. 23, 2024

(65) Prior Publication Data

US 2026/0032153 A1    Jan. 29, 2026

(51) Int. Cl.
*H04L 29/06* (2006.01)
*H04L 9/40* (2022.01)
(52) U.S. Cl.
CPC .............. *H04L 63/20* (2013.01); *H04L 63/10* (2013.01); *H04L 63/104* (2013.01)
(58) Field of Classification Search
None
See application file for complete search history.

(56) References Cited

U.S. PATENT DOCUMENTS

| | | | | |
|---|---|---|---|---|
| 7,113,994 B1 * | 9/2006 | Swift | ...................... | G06F 21/33 |
| | | | | 709/200 |
| 10,326,744 B1 * | 6/2019 | Nossik | ................ | H04L 63/0435 |
| 10,511,584 B1 | 12/2019 | Baer et al. | | |

(Continued)

FOREIGN PATENT DOCUMENTS

JP        2023537746 A  *  9/2023   ......... H04L 67/1097

OTHER PUBLICATIONS

Stoian, A., "OCI Bastion as a Service", Networking, https://www.ateam-oracle.com/post/oci-bastion-as-a-service, Oct. 30, 2021.

(Continued)

*Primary Examiner* — Benjamin E Lanier
(74) *Attorney, Agent, or Firm* — Mughal Gaudry & Franklin PC

(57) ABSTRACT
A cloud infrastructure system is provided for storing cross-tenancy authorization policies for authorizing different users from different tenancies to have different levels of access to bastion functionality that impacts the different tenancies. Stored cross-tenancy authorization policies include, for a first tenancy, policies that authorize a first set of users for bastion service creation and a second set of users for bastion service access, and, for a second tenancy, policies that authorize the second set of users for bastion session creation and the first set of users for deleting a portion of the second tenancy from which bastion sessions may be accessed. Based on the policies, the system authorizes creation of a bastion service that is configured to use a recording destination that is not modifiable by the second user, and then uses the bastion service to create a bastion session for securely accessing resource(s) of the first tenancy. Bastion session activity for the bastion session is logged to the recording destination.

20 Claims, 5 Drawing Sheets

(56) References Cited

U.S. PATENT DOCUMENTS

| | | | |
|---|---|---|---|
| 2017/0171245 A1* | 6/2017 | Lee | G06F 16/958 |
| 2018/0075231 A1* | 3/2018 | Subramanian | H04L 63/0807 |
| 2019/0098037 A1* | 3/2019 | Shenoy, Jr. | H04L 63/1441 |
| 2020/0293337 A1* | 9/2020 | Rangasamy | G06F 9/54 |
| 2020/0412768 A1* | 12/2020 | Hegde | H04L 63/10 |
| 2022/0035642 A1 | 2/2022 | Goldman et al. | |
| 2023/0097517 A1* | 3/2023 | Heranjal | H04L 45/38 |
| | | | 709/238 |
| 2023/0231833 A1 | 7/2023 | Cook et al. | |

OTHER PUBLICATIONS

Vakkalam, Praveen Kumar Pedda, "Securely access Oracle Cloud VMware Solution using OCI Bastion service", Partner Solutions, https://blogs.oracle.com/cloudsecurity/post/securely-access-oracle-cloud-vmware-solutions-using-oci-bastion-service, Jun. 14, 2022.
International Search Report & Written Opinion notified Nov. 11, 2025 for PCT Application No. PCT/US2025/037022.

\* cited by examiner

100

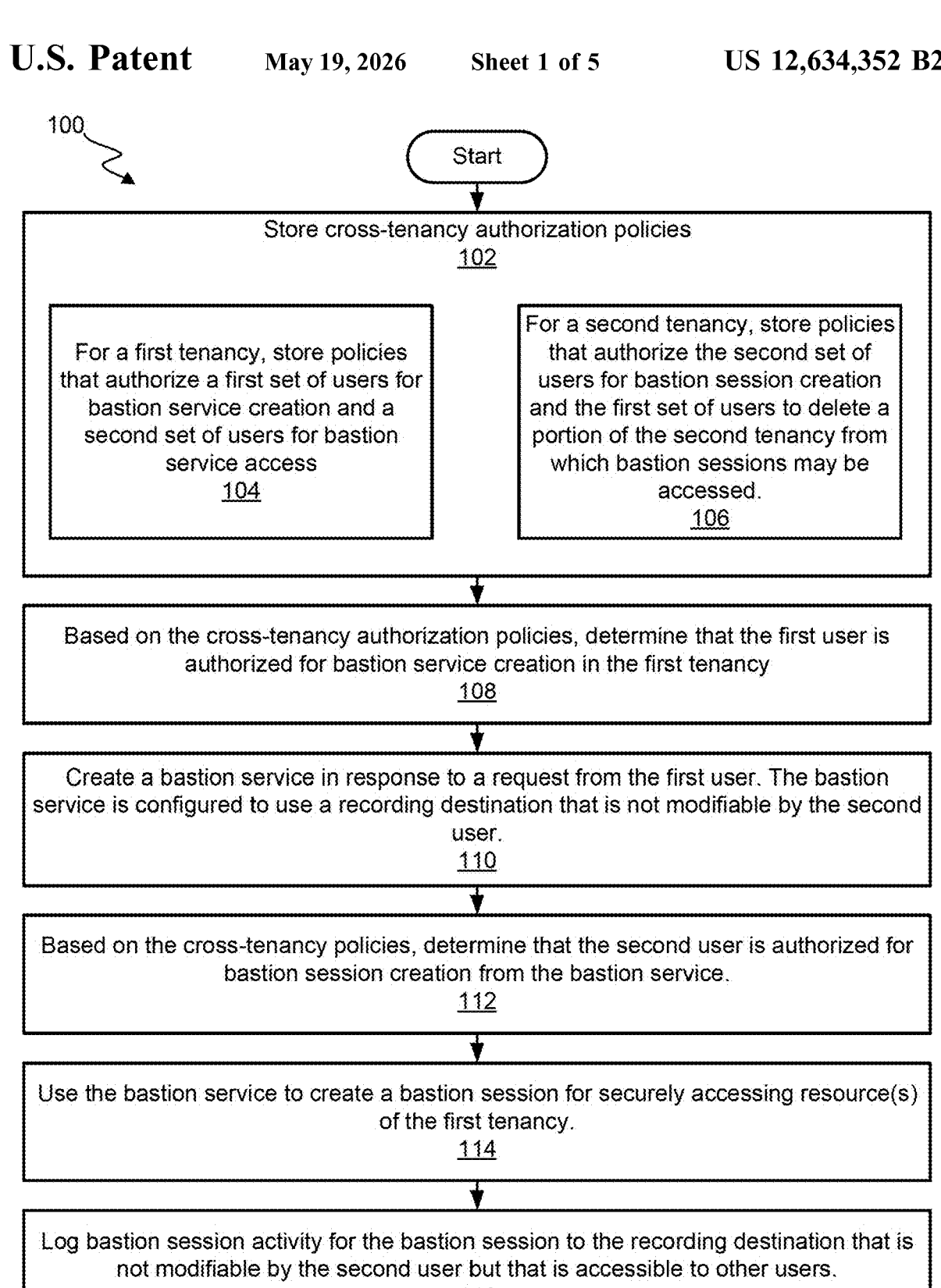

Start

Store cross-tenancy authorization policies
102

For a first tenancy, store policies that authorize a first set of users for bastion service creation and a second set of users for bastion service access
104

For a second tenancy, store policies that authorize the second set of users for bastion session creation and the first set of users to delete a portion of the second tenancy from which bastion sessions may be accessed.
106

Based on the cross-tenancy authorization policies, determine that the first user is authorized for bastion service creation in the first tenancy
108

Create a bastion service in response to a request from the first user. The bastion service is configured to use a recording destination that is not modifiable by the second user.
110

Based on the cross-tenancy policies, determine that the second user is authorized for bastion session creation from the bastion service.
112

Use the bastion service to create a bastion session for securely accessing resource(s) of the first tenancy.
114

Log bastion session activity for the bastion session to the recording destination that is not modifiable by the second user but that is accessible to other users.
116

End

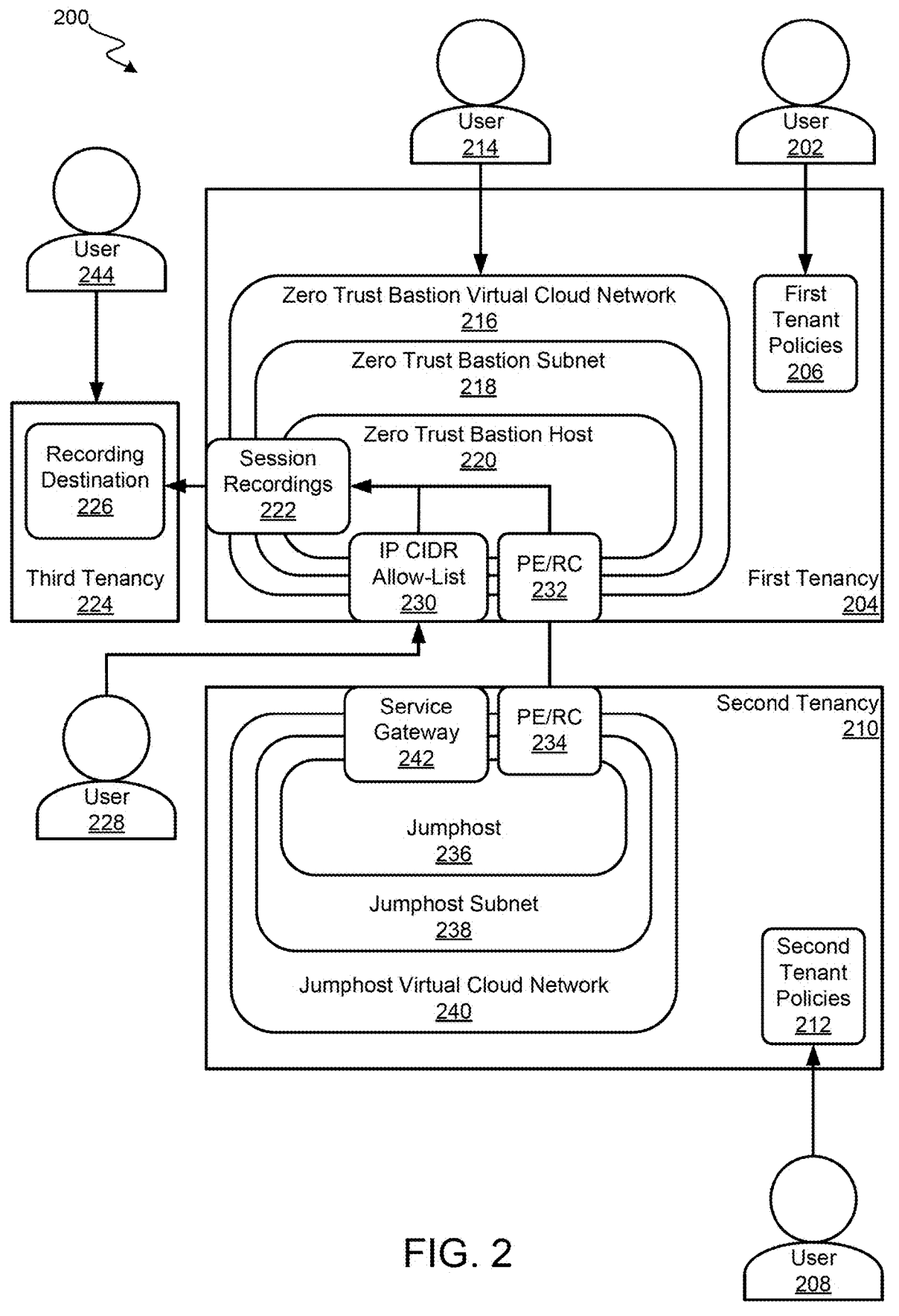

User 214

User 202

First Tenancy 204

First Tenant Policies 206

Zero Trust Bastion Virtual Cloud Network 216

Zero Trust Bastion Subnet 218

Zero Trust Bastion Host 220

Session Recordings 222

IP CIDR Allow-List 230

PE/RC 232

User 244

Recording Destination 226

Third Tenancy 224

Second Tenancy 210

Service Gateway 242

PE/RC 234

Jumphost 236

Jumphost Subnet 238

Jumphost Virtual Cloud Network 240

Second Tenant Policies 212

User 228

User 208

FIG. 2

SEPARATE ACCESS CONTROL FOR MANAGING BASTIONS AND BASTION SESSIONS

BACKGROUND

Companies will go to great lengths to ensure their software and data is secure. Data breaches and cyberattacks occur thousands of times per day and often multiple times per minute. Data breaches and cyberattacks often cost companies millions of dollars. Dealing with data breaches and cyberattacks after-the-fact requires triaging to confirm what breach happened, mitigate further loss, identify any sensitive data that was stolen, re-secure logins, passwords, certificates, tokens, and other authentication pathways, contact impacted parties, and file mandatory reports.

For software companies, software and data security are even more important. Compromised software released by one company could impact potentially hundreds or thousands of companies and potentially millions or billions of customers, depending on the reach of the software across the industry. For this reason, software companies must be even more careful that their products and services are not exposing their customers.

In some scenarios, customers of software companies can cause data breaches that impact other customers. If the software company allows the customer to use or modify certain computing resources, without the proper security review and boundaries in place, the customer may create back door pathways into those computing resources that impact the service provider more generally.

Software companies are understandably hesitant about sharing their code or sharing any environments with other software companies, even partners, even if the purpose is to guard against data breach. In reality, sharing code between partners may result in a higher risk for data breach if there is no visibility into how the shared code or shared environments are being used.

BRIEF SUMMARY

In some embodiments, a computer-implemented method uses cross-tenancy authorization policies for authorizing different users from different tenancies to have different levels of access to bastion functionality that impacts the different tenancies. Stored cross-tenancy authorization policies include, for a first tenancy, policies that authorize a first set of users for bastion service creation and a second set of users for bastion service access, and, for a second tenancy, policies that authorize the second set of users for bastion session creation and the first set of users for deleting a portion of the second tenancy from which bastion sessions may be accessed. Based on the policies, a system authorizes creation of a bastion service that is configured to use a recording destination that is not modifiable by the second user, and then uses the bastion service to create a bastion session for securely accessing resource(s) of the first tenancy. Bastion session activity for the bastion session is logged to the recording destination.

In one embodiment, a computer-implemented method comprises storing a first set of authorization policies of a first tenancy of a multi-tenant cloud infrastructure. The first set of authorization policies authorizes a first set of one or more users for bastion service creation and authorizes a second set of one or more users for bastion service access. The first set of one or more users comprises a first user from the first tenancy and the second set of one or more users comprises a second user from a second tenancy of the multi-tenant cloud infrastructure. The computer-implemented method further comprises storing a second set of authorization policies of the second tenancy of the multi-tenant cloud infrastructure. The second set of authorization policies authorizes the first set of one or more users to delete a portion of the second tenancy from which bastion sessions may be accessed and authorizes the second set of one or more users for bastion session creation in the second tenancy. Based on the first set of authorization policies and the second set of authorization policies, the computer-implemented method determines that the first user is authorized for bastion service creation in the first tenancy, and the computer-implemented method creates a bastion service in response to a request from the first user. The bastion service is configured to use a recording destination that is not modifiable by the second user. Based on the first set of authorization policies and the second set of authorization policies, the computer-implemented method determines that the second user is authorized for bastion session creation from the bastion service, and the computer-implemented method uses the bastion service to create a bastion session for securely accessing one or more resources of the first tenancy. The computer-implemented method further comprises logging bastion session activity for the bastion session to the recording destination that is not modifiable by the second user. The recording destination is accessible to one or more users other than the second user.

In a further embodiment, the one or more resources accessible in the bastion session are in a first subnet of a first virtual cloud network of the first tenancy. The computer-implemented method may further include, based at least in part on a request from a third user, creating one or more other bastion sessions for securely accessing one or more other resources of a second subnet of a second virtual cloud network in the first tenancy. The first subnet is different than the second subnet. Bastion session activity for the one or more other bastion sessions is logged to a recording destination that is accessible to one or more users other than the third user.

In the same or a different embodiment, the first set of authorization policies of the first tenancy further authorizes a third set of one or more users to delete a portion of the first tenancy from which bastion sessions may be accessed and further authorizes a fourth set of one or more users for bastion session creation in the first tenancy. The second set of authorization policies of the second tenancy further authorizes the third set of one or more users for bastion service creation and further authorizes the fourth set of one or more users for bastion service access. The third set of one or more users comprises a third user from the second tenancy and the fourth set of one or more users comprises a fourth user from the first tenancy. The computer implemented method further comprises, based on the first set of authorization policies and the second set of authorization policies, determining that the third user is authorized for bastion service creation in the second tenancy, and creating a second bastion service in response to a request from the third user. The second bastion service specifies a second recording destination that is not modifiable by the fourth user. The computer implemented method further comprises, based on the first set of authorization policies and the second set of authorization policies, determining that the fourth user is authorized for bastion session creation from the second bastion service, and using the second bastion service to create a second bastion session for securely accessing one or more resources of the second tenancy. The computer implemented method further comprises logging bastion session activity for the second bastion session to the second recording destination that is not modifiable by the fourth user. The second recording destination is accessible to one or more users other than the fourth user.

In the same or a different embodiment, the second set of one or more users is associated with one or more IP address ranges, and determining that the second user is authorized for bastion session creation from the bastion service comprises validating that a communication from the second user is within the one or more IP address ranges.

In the same or a different embodiment, the bastion session activity comprises one or more secure communications between the first tenancy and the portion of the second tenancy. The computer-implemented method further comprises monitoring one or more inputs or outputs from within the bastion session according to a configuration of the bastion service.

In the same or a different embodiment, the computer-implemented method further comprises establishing a plurality of connections with a plurality of users of the bastion session, and enforcing one or more constraints on the bastion session based at least in part on one or more constraints specified by the bastion service. Resources are accessed by the plurality of users in the bastion session through the one or more constraints of the bastion service.

In the same or a different embodiment, the computer-implemented method further comprises authenticating the first user to a first user session using a bearer token received according to a Security Assertion Markup Language (SAML) communication.

In the same or a different embodiment, the computer-implemented method further comprises authenticating the second user to a second user session by issuing a Kerberos ticket to the second user encrypted using a server key. The ticket comprises a session key that is used for authentication of the second user to the second user session.

In the same or a different embodiment, logging the bastion session activity for the bastion session to the recording destination comprises storing the bastion session activity in an access-controlled storage container in a third tenancy. Storing the bastion session activity in the access-controlled storage container triggers an automated analysis of the bastion session activity.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1 illustrates a flow chart of an example process that uses cross-tenancy authorization policies for authorizing different users from different tenancies to have different levels of access to bastion functionality that impacts the different tenancies.

FIG. 2 illustrates a system diagram showing an example cloud infrastructure that uses cross-tenancy authorization policies for authorizing different users from different tenancies to have different levels of access to bastion functionality that impacts the different tenancies.

DETAILED DESCRIPTION

Figure 3:
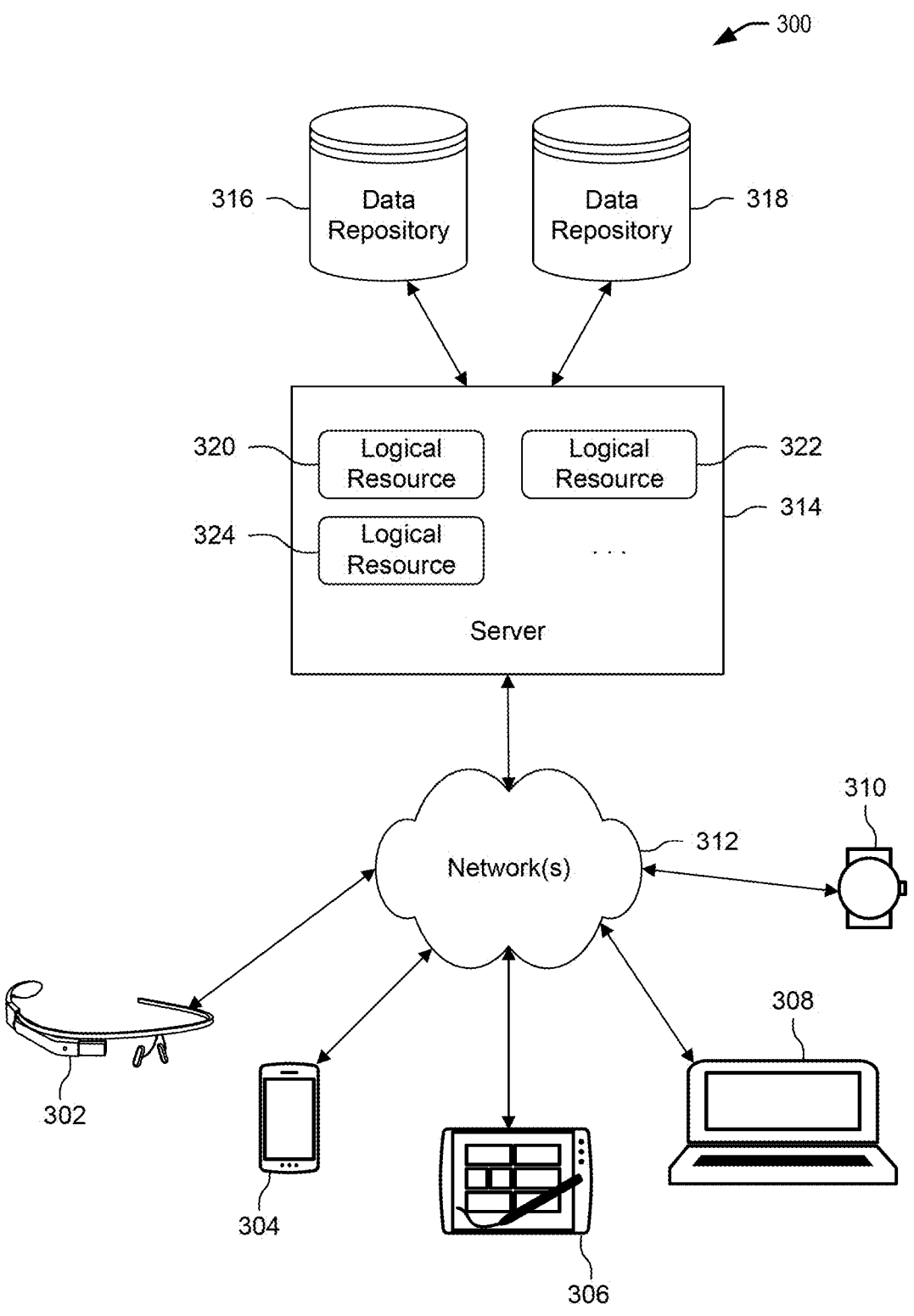
FIG. 3 depicts a simplified diagram of a distributed system for implementing certain aspects.

A cloud infrastructure system uses cross-tenancy authorization policies for authorizing different users from different tenancies to have different levels of access to bastion functionality that impacts the different tenancies. Based on the policies, a system authorizes creation of a bastion service that is configured to use a recording destination that is not modifiable by the second user, and then uses the bastion service to create a bastion session for securely accessing resource(s) of the second tenancy. Bastion session activity for the bastion session is logged to the recording destination. In various embodiments, the cloud infrastructure system is implemented using non-transitory computer-readable storage media to store instructions which, when executed by one or more processors of one or more computer systems, cause management of bastion service access in a multi-tenant cloud environment. The bastion service access may be managed on a private or public cloud that includes processors and one or more client display devices for showing bastion service management or bastion session recording information to a user.

Various embodiments enable zero-trust cloud actors (cloud provider, cloud customer, and external cloud consumer, such as a governmental entity) to operate with higher levels of confidence that sensitive information is not being exposed by other cloud actors. Some cloud customers may not be able to do business in certain countries at all without such restrictions in place due to the additional assurances that may be required from country to country to variously protect individuals and businesses in the country once such assurances are known to be available.

In various embodiments, a zero-trust bastion architecture divides control over bastions and bastion sessions among the cloud actors. The zero trust bastion architecture also includes a customizable destination for logs as an attribute of bastions to be defined in the process of creating/updating bastions (but not included in the process of creating/updating bastion sessions). The zero-trust bastion architecture provides separate access control for managing bastions and managing bastion sessions for the same bastion service. For example, managing bastions may be allowed for one group of users (optionally from a first tenancy, such as the cloud provider's operator access tenancy), and managing bastion sessions may be allowed for a different group of users (optionally from a different tenancy, such as an identity tenancy). These access policies for managing bastions or bastion sessions are tied to the same compartment, and the bastion is created within that compartment. Managing bastions may include the ability to specify a bastion session recording destination, and managing bastion sessions permissions may or may not include the ability to specify a bastion session recording destination. The recording destination may be hard-coded for a bastion created within a specific location (such as a specific tenancy or compartment), and a requester of a bastion and/or bastion session may be able to specify additional destination(s) as part of bastion creation. Managing bastions across tenancies may be allowed for a group of users based on a cross-tenancy policy, such as one using admit and/or endorse statements. Similarly, managing bastion sessions across tenancies may be allowed for a group of users based on a cross-tenancy policy, such as one using admit and/or endorse statements.

A description of managing bastion service access is provided in the following sections:

TRUST IN A MULTI-TENANT CLOUD SERVICES ARCHITECTURE

BASTIONS AND BASTION SESSIONS

CROSS-TENANCY MANAGEMENT OF BASTIONS AND BASTION SESSIONS

DISTRIBUTED CONTROL OF DESTINATION FOR BASTION SESSION LOGS

COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Trust in a Multi-Tenant Cloud Services Architecture

Compartments are logical boundaries that group resources. Each cloud resource exists in a compartment. Compartments are hierarchical constructs that allow customers to vertically manage resources. These constructs can be used for a number of purposes, including, but not limited to: setting access policies for cloud resources on a compartment basis (security), setting usage limits or billing policies on a compartment basis (metering/billing), setting governance or compliance rules on a compartment basis (compliance/audit), serving as a container for resources that are moved as a group (e.g., moving resources in one tenancy into a compartment of another tenancy) (mergers/changes); and/or serving as a container for resources that interact with a third-party (third-party integrations). Policies may be specific to a given compartment and not to other compartments.

A tenancy is a root compartment. Each tenancy is associated with a tenancy administrator. The tenancy administrator has permissions to define which users can perform which actions on which resources within the tenancy. The root compartment may have child compartments nested within the root compartment, and different policies may be specified for the child compartments. The root compartment may also have policies that apply to all child compartments within the root compartment. Compartments may be further subdivided depending on the implementation.

A tenancy may include one or more virtual cloud networks (VCNs) that are managed within the tenancy. The VCNs may further include subnets, which are segmented or otherwise partitioned or access-controlled portions of the virtual cloud network. Subnets may have valid IP address ranges assigned within the subnet, and devices or virtual devices using these IP addresses may communicate with each other based on network restrictions for traffic within the subnet. Network devices such as routers managing the subnet may impose other network restrictions for traffic outside the subnet. Virtual networks may be divided and sub-divided in any manner using network devices to enforce varying restrictions at different levels of sub-division. Various architectures may allow devices that share deeper more highly nested networks to communicate more freely with each other, while other devices in different layers or different sub-networks may be highly restricted or filtered from intercommunication or may be fully restricted or blocked from communicating with each other.

Although tenancies exist as different compartments in a multi-tenant cloud infrastructure, access policies specify which users can perform which actions on which resources in which compartment. For example, access policies may have the following format:

Allow group<identity_domain_name>/<group_name> to <verb> <resource-type> in compartment <compartment_name>

An administrator of a tenancy (which is a root compartment) may define user groups and compartments in the tenancy. The cloud provider (e.g., Oracle Cloud Infrastructure, Amazon Web Services, etc.) may define the possible verbs and resource-types that can be used in policies.

In various scenarios, users of cloud services or cloud actors themselves may want assurances that sensitive information is not leaking or otherwise being exposed by the cloud services. Software assurance for a cloud environment may involve an assurance administrator monitoring the activities of a cloud customer to ensure that the cloud customer is not misusing cloud resources, such as exposing sensitive information from the cloud resources to undesired destinations/recipients. In scenarios where the assurance administrator and the cloud provider are the same entity, this entity may be referred to as a trusted technology provider (TTP).

In a cloud environment requiring software assurance, an assurance administrator may have access to the resources owned by the cloud customer in order to perform assurance monitoring. The cloud customer may grant the assurance administrator some permissions so that the assurance administrator can access customer-owned resources and perform monitoring, but the cloud customer does not grant unrestricted access. The cloud customer maintains control over such access to prevent the assurance administrator from causing harm to or divulging information about the cloud customer.

The cloud customer retains access to the resources owned by the assurance administrator in order to ensure that the assurance administrator is not performing undesired actions, such as changing or copying customer code. The assurance administrator grants the cloud customer some permissions so that the cloud customer can access administrator-owned resources and perform monitoring, but the assurance administrator wants to maintain control over such access. Allowing the cloud customer to monitor the monitoring activities of the assurance administrator while the assurance administrator monitors activities of the cloud customer creates mutual trust. The cloud customer may grant some permissions to the assurance administrator so that the assurance administrator can assure the cloud customer is complying with various policies of the cloud customer, of local governments, or of business partners. The assurance administrator may grant some permissions to the cloud customer so the cloud customer can assure that the assurance administrator is acting within the scope of assurance against policy violations and is not overextending to unauthorized activity.

Additionally, an assurance administrator may desire to have access to logs of bastions or other mechanisms used for monitoring, whether created by the assurance administrator or the cloud customer. Meanwhile, the cloud customer should have access to the logs of bastions or monitoring mechanisms created by the cloud customer, but not necessarily access to logs of bastions created by the assurance administrator.

Access policies may be used for restricting access. Access policies may be applied to enforce permissions in a multi-tenant environment using admit and endorse statements where control, use, and configuration of environments cannot be symmetrical between different tenants.

Bastions and Bastion Sessions

Bastions are logical entities that provide restricted and potentially time-limited secure access to resources that do not have public endpoints and use strict resource access controls. Bastions reside in a public subnet and establish the network infrastructure to connect a user to a target resource in a private subnet. Example target resources include compute instances, bare metal and virtual machines, MySQL, ATP, OKE, and any other resource that allows Secure Shell Protocol (SSH) access. With Oracle® Cloud Infrastructure (OCI) Bastion service, customers can enable access to private hosts without deploying and maintaining a jump host. In addition, customers gain improved security posture with identity-based permissions and a centralized, audited, and time-bound SSH session. In a particular embodiment, Oracle® Cloud Infrastructure (OCI) Bastion service removes the need for a public IP for bastion access, eliminating the hassle and potential attack surface from remote access. Bastion deployment may be controlled by the owner of the private host.

Bastions let authorized users connect from specific IP addresses to target resources using Secure Shell (SSH) sessions or other secure connections. When connected, users can interact with the target resource by using any software or protocol supported by SSH. For example, the user may use Remote Desktop Protocol (RDP) to connect to a Windows host, or use Oracle Net Services to connect to a database. Bastions may be used to access compute instances that are in compartments associated with a security zone that indicates the instances cannot have public endpoints, as access via SSH does not expose a public endpoint.

Bastion sessions let authorized users in possession of the private key in an SSH key pair connect to a target resource for a predetermined amount of time as configured by a bastion service. The public key in the SSH key pair is provided at the time a bastion session is created, and then the private key is supplied to connect to the bastion session. In addition to presenting the private key, an authorized user must also attempt the SSH connection to the target resource from an IP address within a range of IP addresses allowed by the bastion's Classless Inter-domain Routing (CIDR) allow-list.

Bastion services may use a variety of types of sessions. A managed SSH session allows SSH access to compute instances that are running a Linux platform image, an OpenSSH server, the Oracle Cloud Agent, and a Bastion plugin enabled on the Oracle Cloud Agent. An SSH port forwarding session does not require an OpenSSH server or the Oracle Cloud Agent to be running on the target resource. Port forwarding creates a secure connection between a specific port on a client machine and a specific port on the target resource. Using this connection, other protocols such as RDP, Oracle Net Services, and MySQL may be tunneled over SSH. A dynamic port forwarding (SOCKS5) session allows a dynamic connection to a target resource in a private subnet by creating a tunnel to the target subnet for which the client decides which resource and port to connect to.

Bastions may be accessed using a console (a browser-based interface), a command-line interface (CLI), or a REST API, assuming that the user accessing the interface has authorization to access bastion services or sessions. Authorization may be configured by an administrator for the tenancy or tenancies in which the bastion is being configured.

Cross-Tenancy Management of Bastions and Bastion Sessions

FIG. 1 illustrates a flow chart of an example process 100 that uses cross-tenancy authorization policies for authorizing different users from different tenancies to have different levels of access to bastion functionality that impacts the different tenancies. As shown, process 100 starts in block 102, by storing cross-tenancy authorization policies. Block 102 includes sub-block 104 where, for a first tenancy, policies are stored that authorize a first set of users for bastion service creation and a second set of users for bastion service access. Block 102 also includes sub-block 106, where, for a second tenancy, policies are stored that authorize the second set of users for bastion session creation and the first set of users to delete a portion of the second tenancy from which bastion sessions may be accessed. In block 108, based on the cross-tenancy authorization policies, a system determines that the first user is authorized for bastion service creation in the first tenancy. The system creates a bastion service in response to a request from the first user, and the bastion service is configured to use a recording destination that is not modifiable by the second user in block 110. In block 112, based on the cross-tenancy policies, the system determines that the second user is authorized for bastion session creation from the bastion service. In block 114, the bastion service is used to create a bastion session for securely accessing resource(s) of the first tenancy. Bastion session activity for the bastion session is logged in block 116 to the recording destination that is not modifiable by the second user but that is accessible to other users. The logged bastion session activity may be further analyzed before the process concludes.

FIG. 2 illustrates a system diagram showing an example cloud infrastructure 200 that uses cross-tenancy authorization policies for authorizing different users from different tenancies to have different levels of access to bastion functionality that impacts the different tenancies. As shown, user 202, such as an administrator of first tenancy 204, has access to first tenancy 204 to modify first tenant policies 206. User 208, such as an administrator of second tenancy 210, has access to second tenancy 210 to modify second tenancy policies 212. User 214, which may be a same or different user than user 202, authenticates with first tenancy 204 to create zero trust bastion host 220 in zero trust bastion subnet 218 of zero trust bastion virtual cloud network 216. The zero trust bastion host 220 may be configured, for example, to store session recordings 222 of any bastion sessions to recording destination 226 in third tenancy 224. User 228, which may be the same or a different user than user 208, authenticates into first tenancy 204, clearing IP Classless Inter-domain Routing (CIDR) Allow-List 230. For example, user 228 may authenticate to first tenancy via an identity provider that was also used to authenticate user 208 to second tenancy 210. Once authorized, user 228 may create a bastion session for accessing zero trust bastion host 220 from jumphost 236 of jumphost subnet 238 in jumphost virtual cloud network 240 of second tenancy 210 via a Private Endpoint/Reverse Connection (PE/RC) service 234. Jumphost 236 may also include service gateway 242. Second tenancy policies 212 may specify that user(s) from first tenancy 204 have authorization to delete resources of jumphost 236, jumphost subnet 238, and/or jumphost virtual cloud network 240. For interactions occurring with jumphost 236 via the bastion session, session recordings 222 are stored in recording destination 226 of third tenancy 224. User 244, which may be the same or a different user than user 202 or 214, may access third tenancy 224 to analyze session recordings 222, aggregate computations or statistics determined from session recordings 222, any results of automated rules for triggering actions, computations, or communications based on characteristics of session recordings 222.

In one example, a cloud services provider may want to guard against unauthorized usage of a cloud endpoint by a cloud customer. The cloud services provider may prepare to create a bastion service for the cloud endpoint and send information about the cloud endpoint to the cloud customer, such as the subnet and virtual cloud network of the cloud endpoint, as well as a group of users for which bastion service creation access should be granted. The cloud customer may specify, to the cloud provider, a subnet of a virtual cloud network of the customer's tenancy for which authorization has been granted, to the cloud provider, to delete the subnet if deemed necessary. A message from the cloud customer to the cloud provider may specify the virtual cloud network and the subnet of the customer's tenancy, as well as another group of users for which bastion session creation access should be granted. The multi-tenant cloud provider may then create a bastion service for the endpoint after confirming the authorizations have been granted, and the bastion service may be used, by the cloud customer, to create bastion sessions for accessing the cloud endpoint. The bastion session may be monitored and further restricted by the cloud provider and/or by the cloud customer.

In another example, a multi-tenant cloud provider or other assurances provider may want to access a subnet of a cloud customer, such as a subnet used for providing application services by the cloud customer, from outside of a tenancy of the cloud customer. The cloud provider may request, from the cloud customer, access to the subnet. The provider requesting access may send a request to the cloud customer for access to a subnet of a virtual cloud network or a subnet associated with certain functionality, and the request may specify a group of users for which bastion session creation access should be granted as well as a subnet of the cloud provider that would be used for accessing the bastion session. The cloud customer and cloud provider may update the policies so the group of users is authorized to create bastion sessions and another group of users of the cloud customer is authorized to create bastion services. The other group of users may create a bastion service and may specify a recording destination for monitoring bastion session activity. The cloud provider may create a time-limited bastion session using the bastion service, and the bastion session may be monitored and further restricted by the cloud customer and/or by the cloud provider.

If a bastion service is requested (by either a provider or a tenant) for a subnet that already has a bastion service configured, the existing bastion service may be used to create bastion sessions without need for creating additional bastion sessions. Additional users may be added to the bastion sessions by adjusting group membership for the group already admitted to the bastion service (such as adjusting membership of a group of an identity provider, such as Google IDP), and/or additional recording destinations may be specified for the bastion session if needed to support various purposes for the same subnet.

A creation of a bastion service may be restricted based on identity and access management (IAM) policies that verify a user creating the bastion service is authorized to create the bastion service for a given compartment. The IAM policies may manage bastion resources to determine which users are authorized to create bastion services and bastion session resources to determine which users are authorized to create bastion sessions using the bastion services. The users authorized to create bastion services may not be authorized to create bastion sessions using those bastion services, and/or the users authorized to create bastion sessions may not be authorized to create the bastion services needed to create those bastion sessions. The bastion service may be created and configured by a bastion creator so a group of users may interact with the bastion service to create or use bastion sessions. A tenancy administrator of the bastion service tenancy may determine which users are allowed to create bastion services, and a tenancy administrator of another tenancy may determine which users are allowed to create bastion sessions for accessing the other tenancy through the bastion service. Authorizations may be specified on a per-compartment basis and/or a per-bastion basis. For example, the tenancy administrator of the bastion service may define a policy that specifies a default group of users that are able to create bastion services in a compartment, and the tenancy administrator of the other tenancy may define another policy that specifies a default group of users that are able to create bastion sessions for accessing a compartment of the other tenancy through the bastion service.

The policies may be specified in a cross-tenant manner such that users may be admitted, allowed, or endorsed across different tenancies to create bastion services and/or to create bastion sessions. The policies may be set up in each tenancy before the bastions are created, before bastion sessions are created, and before bastion session recordings are created. Having users that are allowed to create bastion services in one tenancy does not allow those users to use the bastion services to accomplish anything in a different tenancy. Similarly, having users that are allowed to create bastion sessions in one tenancy does not allow those users to create a bastion service in a bastion service tenancy for use in creating the bastion sessions. Without cooperation across both tenancies, the bastion session cannot be both created and used.

Example cross-tenancy policies that may be implemented in a first tenancy include:

```
define      tenancy      <idp_tenancy_name>      as
    '<idp_tenancy_ocid>'
define      group      <sec_ops_group_name>      as
    '<sec_ops_group_ocid>'
define      group      <tt_us_ops_group_name>      as
    '<tt_us_ops_group_ocid>'
admit  group  <sec_ops_group_name>  of  tenancy
    <idp_tenancy_name> to manage virtual-network-fam-
    ily in compartment <jumphost_compartment_name>
    where any
{request.permission 'VNIC CREATE', request.permis-
    sion 'VNIC DELETE',
request.permission 'VNIC ASSIGN', request.permission
    'VNIC UNASSIGN',
request.permission 'VNIC ASSOCIATE NETWORK
    SECURITY GROUP',
request.permission 'VNIC DISASSOCIATE NETWORK
    SECURITY GROUP',
request.permission 'PRIVATE_IP CREATE',
request.permission 'PRIVATE_IP DELETE', request.per-
    mission 'PRIVATE_IP ASSIGN',
request.permission 'PRIVATE_IP UNASSIGN', request-
    .permission 'SUBNET ATTACH',
request.permission 'SUBNET DETACH', request.per-
    mission 'SUBNET_READ',
request.permission 'VCN READ',
request.permission 'NETWORK SECURITY GROUP
    UPDATE MEMBERS'}
admit   group   <sec_ops_group_name>   of   tenancy
    <idp_tenancy_name> to inspect work-requests in com-
    partment <jumphost_compartment_name>
admit  group  <tt_us_ops_group_name>  of  tenancy
    <idp_tenancy_name> to read instance-family in com-
    partment <jumphost_compartment_name>
```

```
admit   group   <tt_us_ops_group_name>   of   tenancy
    <idp_tenancy_name> to read instance-agent-plugins in
    compartment <jumphost_compartment_name>
admit   group   <tt_us_ops_group_name>   of   tenancy
    <idp_tenancy_name> to inspect work-requests in com-
    partment <jumphost_compartment_name>
admit   group   <tt_us_ops_group_name>   of   tenancy
    <idp_tenancy_name>  to  manage  bastion-sessions  in
    compartment <jumphost_compartment_name>
admit   group   <tt_us_ops_group_name>   of   tenancy
    <idp_tenancy_name> to inspect virtual-network-fam-
    ily in compartment <jumphost_compartment_name>
    where                                           any
    {request.permission='PRIVATE_IP_READ',
    request.permission='SUBNET_READ'}
```

In the example, the admission for the trusted technology operator group of the first tenancy to manage bastion sessions for a compartment is bolded, and the admissions for the security operator group such as cloud provider users to manage and inspect certain activities (optionally limited or restricted to a specified subset of total available activities) in the same compartment are italicized. In various examples, the policies of a first tenancy being used for bastion session access may authorize bastion session activities by a group of users associated with the first tenancy and the ability to delete, by another group of users associated with a bastion tenancy, a portion of the first tenancy being used for bastion session access.

In one embodiment, the ability to delete the portion of the first tenancy is used to place a time constraint on the bastion session. The tenancy containing the bastion session may be deleted by a user of the bastion tenancy, pursuant to executed instructions causing the deletion by the bastion service, after an expiration of a timer. The bastion tenancy may be limited in scope by the time limitation, providing assurance to the owner of the bastion tenancy that the bastion session will not go beyond the agreed-upon scope.

Example cross-tenancy policies that may be implemented in a bastion host tenancy include:

```
define      tenancy      <vpc1_tenancy_name>      as
    <vpc1_tenancy_ocid>'
admit group <sec_ops_group_name> to manage bastion
    in compartment <bastion_compartment_name>
admit group <sec_ops_group_name> to manage virtual-
    network-family  in  compartment  <bastion_compart-
    ment_name>
admit  group  <sec_ops_group_name>  to  inspect  work-
    requests  in  compartment  <bastion_compartment_
    name>
endorse group <sec_ops_group_name> to manage vir-
    tual-network-family in tenancy <vpc1_tenancy_name>
endorse group <sec_ops_group_name> to inspect work-
    requests in tenancy <vpc1_tenancy_name>
admit group <tt_us_ops_group_name> to use bastions in
    compartment <bastion_compartment_name>
admit  group  <tt_us_ops_group_name>  to  read  bastion-
    sessions  in  compartment  <bastion_compartment_
    name>
admit group <tt_us_ops_group_name> to manage bas-
    tion-sessions in compartment <bastion_compartment_
    name>                  where                  target.bastion-
    session.username=request.user.name
endorse group <tt_us_ops_group_name> to manage bas-
    tion-sessions in tenancy <vpc1_tenancy_name> where
    target.bastion-session.username=request.user.name
endorse   group   <tt_us_ops_group_name>   to   read
    instance-family in tenancy <vpc1_tenancy_name>
``` endorse group <tt_us_ops_group_name> to read
  instance-agent-plugins        in        tenancy
  <vpc1_tenancy_name>
endorse group <tt_us_ops_group_name> to inspect vir-
  tual-network-family in tenancy <vpc1_tenancy_name>
endorse group <tt_us_ops_group_name> to inspect work-
  requests in tenancy <vpc1_tenancy_name>

In the example, the admission and endorsement for the
trusted technology operator group of the first tenancy to use
bastions and read and manage bastion sessions in a com-
partment is bolded, and the admission for the security
operator group such as cloud provider users to manage
bastions in the same compartment is italicized. In various
examples, the policies of a bastion tenancy may authorize
bastion usage and bastion session management by a group of
users associated with a first tenancy being monitored and
bastion management by another group of users associated
with the bastion tenancy.

Example cross-tenancy policies that may be implemented
in a recording tenancy include:
define      tenancy     <sec_ops_tenancy_name>      as
  '<sec_ops_tenancy_ocid>'
define       group       <sec_ops_group_name>       as
  '<sec_ops_group_ocid>'
admit group see_ops_group_name of tenancy boat [bas-
  tion object access tenancy] to read object-family in
  compartment <recording_compartment_name>
allow service bastion_hosts to manage objects in com-
  partment
<recording_compartment_name>        where        any
  {request.permission='OBJECT_CREATE',
  request.permission='OBJECT_OVERWRITE'}

In the example, the allowance for the bastion host of the
bastion host tenancy to create or overwrite objects in a
recording compartment is bolded, and admission of a secu-
rity operator group such as cloud provider users to read the
recordings is italicized. In various examples, the security
operator group of the bastion tenancy or another assurance
team, possibly independent of either tenancy or mutually
agreeable to the owners of both tenancies, may be authorized
to read the recordings to verify that activities occurring in
the bastion session are within agreed-upon constraints.

In various examples, the verb/action used in an access
policy may be create, read, update, or delete. Additionally or
alternatively, the verb/action used in an access policy may be
"manage," which encompasses all of creating, reading,
updating, and deleting (CRUD).

The action of "creating" a bastion includes defining the
attributes of the bastion. One such attribute is the customi-
zable destination for bastion session logs. The action of
"updating" a bastion includes updating the attributes of the
bastion, including the customizable destination for bastion
session logs.

The action of "creating" a bastion session includes defin-
ing the attributes of the bastion session. Attributes of a
bastion session do not include a destination for bastion
session logs.

Based on the access policies that allow users of a first
entity to manage bastions and users of a second entity to
manage bastion sessions, the ability of the users of the
second entity to define the customizable destination for
bastion session logs for bastions created by the first entity is
restricted. Conversely, the users of the second entity has
permissions to define customizable destination for bastion
session logs for bastions created by the second entity.

The identity provider may synchronize group member-
ship changes into the cloud services provider, and the cloud
services provider may log group membership changes of
users known to the identity services provider. When a user
logs in to create a bastion session, the identity provider
performs an authorization check to determine if the user
passes an AuthZ check. Once the AuthZ check is done and
identity is verified, the user has access to create a bastion
session. When performing the authorization check, the cloud
provider may use identity and access management (IAM)
policies to verify that the user is among a group of cloud
provider users who is authorized to access the bastion
service after the user has authenticated as an identity man-
agement user within a corresponding group by the identity
provider and/or that the user is among a group of users that
is authorized to create bastion sessions. Once authenticated
and authorized, the user gains access to the cloud provider's
bastion service tenancy, where the cloud provider fulfills
user requests to create bastion sessions to use the bastion
service.

In one embodiment, a customer of the cloud provider has
an identity provider tenancy that manages groups of users
associated with the customer or part of the customer's
organization that are allowed to access bastion services that
are already created. The identity provider tenancy may also
have cross-tenancy policies with respect to groups of users
associated with the cloud provider or part of the cloud
provider's organization that are allowed to create bastion
services that access subnet(s) of the customer's organiza-
tion.

A zero trust bastion service may be created with settings
that specify which IP addresses or ranges of IP addresses
should be allowed for the bastion service and which users
may use the bastion service to create bastion sessions. A user
may log into a cloud provider tenancy based on an autho-
rization from a cloud infrastructure identity and access
management (IAM) policy control plane call, and, once
authorized to create bastion sessions for a given compart-
ment, creates a bastion session for the bastion service
according to configuration settings for the bastion session.
After a bastion session is created, a user may log into the
bastion session as a user from an authorized group of users
and from an allowed IP address, for example by checking an
IP Classless Inter-domain Routing (CIDR) Allow-List, to
use the bastion session via, for example, an SSH connection
originating from the IP address through the zero trust bastion
service to an intended jumphost destination within the
jumphost VCN and subnet for which the bastion service was
created.

A Private Endpoint/Reverse Connection (PE/RC) service
may be used as a network bridge to forward an SSH
connection from the bastion service to a jumphost in a
private cloud network being accessed via the bastion ser-
vice. The PE/RC service allows traffic to be re-routed to the
virtual cloud network and subnet being accessed by the
bastion service without needing a public IP address.

In various embodiments, a zero trust bastion host may be
deployed on a virtual node in a cloud infrastructure by a
party controlling the node in order to provide restricted
access to resources in a subnet of the node or any other
network or resources accessible to the node as configured.
The zero trust bastion may access virtual resources as a
proxy for virtual or physical resources that are available to
the node. The virtual resources may be wrapped with a
recording call-out that causes inputs and/or outputs using the
virtual resources to be stored in private storage managed by
the zero trust bastion host. For example, all inputs and/or
outputs (e.g., keystroke logging from a terminal or other
interface, and/or network communications to/from the bastion host) received or sent via a secure shell (SSH) connection made available as a bastion session may be saved to the private storage that cannot be modified from the bastion session and may or may not even be viewable or accessible from the bastion session.

In various embodiments in a single multi-tenant cloud infrastructure, different zero trust bastion hosts may be generated to perform monitored activities in a plurality of virtual networks or a plurality of subnets, whether or not the owner of the plurality of virtual networks or plurality of subnets is a same or a different party, and whether or not the users or groups of users performing the monitored activities are users of the same or a different party. In this manner, a plurality of bastion services may be available from a first tenant to monitor activities of a second tenant, and a plurality of other bastion services may be available from the second tenant to monitor activities of the first tenant. In various embodiments, assurance provider(s) analyzing the monitored activities may be under the control of either tenant, both tenants, or neither tenant. The bastion services may provide a wide range of functionality for untrusted users with the ability to audit activities of the untrusted users to ensure that the untrusted users are not acting outside a scope of an agreed-upon engagement for using the wide range of functionality. A party in control of the bastion host may adjust restrictions and/or revoke access if the party performing monitored activities acts outside the scope of the agreed-upon engagement. Such activities outside the scope of the agreed-upon engagement may also give rise to criminal or civil liability, arbitrated or agreed-upon remedies, or legislative action against the party performing monitored activities or individual users thereof, depending on an extent and type of activity and a quality of the bastion session logs describing the activity.

The zero trust bastion host may be accessible via an authenticated secure connection, such as an SSH connection, a token-based connection, a SAML connection, or a Kerberos connection, from another user of a tenancy other than the tenancy of the party controlling the zero trust bastion host. In one embodiment, bastion sessions let authorized users in possession of the private key in an SSH key pair connect to a target resource for a predetermined amount of time. A user provides the public key in the SSH key pair at the time the user creates the session, and then supplies the private key when the user connects. In certain embodiments, an additional requirement for creating an SSH connection is that the authorized user attempts the SSH connection to the target resource from an IP address within the range allowed by the bastion's client Classless Inter-domain Routing (CIDR) block allowlist.

Interactions with resources of the zero trust bastion host by user(s) of the other tenancy, and operation(s) performed on those resources may be logged, via a wrapper on the resources, to a recording destination of the zero trust bastion host. The recording destination may be accessible to assurance user(s) for analyzing activity on the zero trust bastion host, for example, to determine whether authorization should continue to be granted on the zero trust bastion host. The assurance user(s) may, as a result of the analysis, determine that the authorization should be revoked, that additional activity should be recorded to the bastion session logs, that additional alerts or notifications should be implemented based on the bastion session logs, that access to certain resource(s) or certain operation(s) thereof (reads, writes, callouts, data exports, etc.) should be revoked without revoking access to other resource(s) or other operation(s) thereof, that other constraint(s) of the bastion service should be modified such as bastion session length, an amount or type (encrypted versus unencrypted, for which object(s) and variable(s)) of data that can be exported from the bastion host, etc.

As used herein, cross-tenancy policies refer to a set of non-congruent access policies in a first tenancy and a second tenancy that allow users in the first tenancy to access resources in the second tenancy and users in the second tenancy to control and monitor such access. For example, the tenancy containing resources to be accessed may include an admit statement, and the other tenancy may include a corresponding endorse statement.

The cloud environment provides granular-level resource types that are recognized by access policies, wherein one resource type is bastion and a separate resource type is bastion-session. This allows access policies to be specifically targeted towards bastions or bastion sessions, thereby allowing separate control of which users get to manage bastions and which users get to manage bastion sessions.

Each tenancy is associated with a tenancy administrator. Hence, a customer tenancy may be administered by a cloud customer, while an assurance tenancy may be administered by an assurance administrator. A customer may create a first compartment within the customer tenancy for containing bastions that allow the assurance administrator to access/connect to customer-owned resources. An assurance administrator may create a second compartment within the assurance tenancy for containing bastions that allow the cloud customer to access/connect to administrator-owned resources. Based on this arrangement, the access policies may be specified.

For the assurance compartment, for example, the assurance administrator may specify the following permissions:

Allow administrator-users to manage bastion in the assurance compartment

Allow customer-users to manage bastion-session in the assurance compartment

For the customer compartment, for example, the customer may specify the following permissions:

Allow customer-users to manage bastion in the customer compartment

Allow administrator-users to manage bastion-session in the customer compartment

Administrator-users refers to a group of users affiliated with the assurance administrator. This can be a dynamic group, such that the membership of the group is defined by user attributes, and the specific members changes based on the attributes of users.

Customer-users refers to a group of users affiliated with the cloud customer. This can be a dynamic group as well. Further, users affiliated with the cloud customer can be defined based on a synch with an external identity provider.

In addition to or in lieu of the access policies, cross-tenancy access policies may be used. In an embodiment, administrator-users are resources within an administrator-identity tenancy, and customer-users are resources within a customer-identity tenancy. Both administrator-identity tenancy and customer-identity tenancy may be owned by or otherwise known to or synchronized with the assurance administrator. Cross-tenancy policies are used to provide the above-described permissions. Cross-tenancy policies include a pair of admit/endorse statements, such as one corresponding statement from each tenancy. As an example, an admit policy in the assurance compartment may admit customer-users from the customer-identity tenancy to access bastion sessions in the assurance compartment, while an endorse statement in the customer-identity tenancy may endorse customer-users from the customer-identity tenancy to access bastion sessions in the assurance compartment. The pair of admit/endorse statements provide permissions to customer-users to manage bastion sessions in the assurance compartment. As another example, an admit policy in the customer compartment may admit administrator-users from the administrator-identity tenancy to access bastion sessions in the customer compartment, while an endorse statement in the administrator-identity tenancy may endorse administrator-users from the administrator-identity tenancy to access bastion sessions in the customer compartment. The pair of admit/endorse statements provide permissions to administrator-users to manage bastion sessions in the customer compartment.

Within the administrator-owned Bastions Service Tenancy, there are access policies that permit the assurance administrator to create/manage bastion hosts, and access policies that permit the cloud customer to create/manage bastion sessions on such bastion hosts. A bastion host may be created within a bastion service tenancy. The bastion host was created by the assurance administrator, per the access policies described above. Further, a bastion session may be created on the bastion host. The bastion session may have been created by the cloud customer (customer-users within an identity provider tenancy), also per the access policies described above. Once the bastion session is created, customer-users may create connections on the session to access resources.

In one embodiment, the bastion host may have a recording destination in an administrator-owned tenancy. The assurance administrator could have specified the recording destination for the administrator-owned bastion host, also per the access policies described above. Given the separation of permissions for creating bastions (also referred to as "bastion services") and bastion sessions, corresponding control over bastion service creation determines permissions to specify recording destinations.

In various embodiments, a cloud infrastructure provider may create a bastion service, and a cloud customer or tenant of the cloud infrastructure provider may create and use bastion sessions with the bastion service. The cloud infrastructure provider may specify a recording destination for bastion session logs, and the recording destination may not be modified by the cloud customer even though the logs relate to usage by users or tools of the cloud customer. In the same or different embodiments, a cloud customer or tenant may create a bastion service, and a cloud infrastructure provider may create and use bastion sessions with the bastion service. The cloud customer may specify a recording destination for bastion session logs, and the recording destination may not be modified by the cloud infrastructure provider even though the logs relate to usage by users or tools of the cloud infrastructure provider. In various embodiments, additional recording destinations may be provided for same or different bastion session logs, and the additional recording destinations may be controlled by either party or exclusively by one party or the other.

Distributed Control of Destination for Bastion Session Logs

A bastion session log is a record of activity in one or more sessions created on a bastion. The bastion session log may be stored in one or more locations that are specified by the bastion service, and the location(s) may be modifiable or not by an owner of the bastion service, an owner of the bastion session, both, or neither. In a particular embodiment, a default storage location may be unmodifiable but may be supplemented with additional parallel storage locations, ensuring that a bastion session recording is available at least at one storage location. In another particular embodiment, a recording destination may be specified on a compartment-specific basis, such that different compartments map to different recording destinations, each of which may or may not be modifiable by either party (bastion creator or bastion session user).

The logs may indicate a timestamp or time period during which the activity was logged, user or user(s) involved in inputting or outputting data according to the activity, interface command(s) received and/or executed, communication(s) sent or received, keystroke(s) pressed, IP address(es) used, partial authentication information supplied or other authentication metadata, types of data viewed or communicated, sizes of data viewed or communicated, and/or any other input or output information relevant to the bastion session.

In one embodiment, if a cloud customer creates a bastion service for a cloud customer tenancy and a cloud provider uses the bastion service to create a bastion session from a cloud provider tenancy, the cloud customer may specify a storage location for recordings of the bastion sessions at bastion creation time and/or may change the storage location for the recordings at any time. Changing a storage location of the bastion sessions may cause the bastion session recordings to be stored in the new location without the ability of the bastion session user, in this case, the cloud provider user, to modify the storage location. In this embodiment, the cloud provider may optionally also specify a parallel storage location for the bastion sessions, such that two bastion session recordings are produced for bastion session activities. Such location may be specified prior to bastion session creation, by default for the cloud provider, or concurrently with bastion session creation. Both the cloud provider and the cloud customer may analyze the bastion session recordings from the corresponding recording location. In a particular embodiment, the parallel storage location is used by the cloud provider for a plurality of tenants in a secure storage location, partitioned or organized by tenant, such that bastion session activities may be analyzed by cloud provider users authorized to analyze such activities regardless of which tenant is utilizing bastion functionality.

In another embodiment, if a cloud provider creates a bastion service for a cloud provider tenancy and a cloud customer uses the bastion service to create a bastion session from a cloud customer tenancy, the cloud provider may specify a storage location for recordings of the bastion sessions at bastion creation time and/or may change the storage location for the recordings. In a particular embodiment, the cloud customer may also optionally specify a parallel storage location for the bastion sessions, such that two bastion session recordings are produced for bastion session activities. Such location may be specified prior to bastion session creation, by default for the cloud customer, or concurrently with bastion session creation. In another embodiment, the storage location is fixed upon bastion service creation. In this embodiment, both the cloud provider and the cloud customer may analyze the bastion session recordings from the corresponding recording location.

In one embodiment, each bastion service has a non-customizable (hard-coded) destination for bastion session logs and a customizable destination for bastion session logs. In one embodiment, only the cloud provider may specify the non-customizable destination. Which users may specify the customizable destination is defined by access policies. A bastion session activity recording destination records session activity that tracks what is happening on the secure connection to the private host. This recording destination can be controlled by a party in a first tenancy with or even without the ability to override the recording destination by the other party in another tenancy.

In one embodiment, the cloud customer is not able to specify the customizable destination for bastion session logs of bastions created by the assurance administrator. However, the cloud customer may be able to specify the customizable destination for bastion session logs of bastions created by the customer. In one embodiment with a separate non-customizable destination for bastion session logs of every bastion, the cloud provider has access to bastion session logs regardless of whether another destination is specified.

The logs may indicate a time that activity occurred via an API provided through the bastion service, a source of the activity (including, for example, a user, tenant, and/or IP address), a target of the activity (including, for example, specific resources in the target tenancy), a type of action, and a type of response received, for example, as a result of the action. Example event logs may include a header ID, target resources, a timestamp of the recorded event, request parameters, and response parameters.

The private storage may be linked with, synchronized with, subscribed to by, or otherwise utilize a remote storage, such as an object storage, of another node in another subnet managed by same or different tenant(s) or user(s) than the tenant(s) or user(s) who manage the zero trust bastion host, and by same or different tenant(s) or user(s) than the tenant(s) or user(s) who manage sessions of the zero trust bastion host. The bastion session recordings in the private storage may be viewed using an interface such as a console or an API.

In one embodiment, one or more of the storage location(s) for the session recordings are stored in an time-restricted manner. At an expiration of a time, the storage location(s) may be destroyed pursuant to cross-tenancy policies, and the contents of the storage location(s) may be deleted and inaccessible from that point forward. In another embodiment, the storage location(s) persist the session recordings in a manner that allows further analysis. The tenancy containing the storage locations may be restricted from data export, may be limited from access to the Internet, or may be accessible only within certain other constraints.

The session recording logs are ingested and analyzed to detect potentially malicious behavior or behavior that is different from expected normal behavior. In one embodiment, the bastion session recordings may trigger automated notifications or other actions that cause a communication of information to a user or group of users. For example, bastion session recordings matching stored patterns may trigger messages indicating that the stored patterns have been detected in the bastion session recordings. The stored patterns may be detected based on the raw bastion session recordings or based on the results of algorithms or aggregations of data pulled form the raw bastion session recordings.

Computer System Architecture

FIG. 3 depicts a simplified diagram of a distributed system 300 for implementing an embodiment. In the illustrated embodiment, distributed system 300 includes one or more client computing devices 302, 304, 306, 308, and/or 310 coupled to a server 314 via one or more communication networks 312. Clients computing devices 302, 304, 306, 308, and/or 310 may be configured to execute one or more applications.

In various aspects, server 314 may be adapted to run one or more services or software applications that enable techniques for managing bastion service access.

In certain aspects, server 314 may also provide other services or software applications that can include non-virtual and virtual environments. In some aspects, these services may be offered as web-based or cloud services, such as under a Software as a Service (SaaS) model to the users of client computing devices 302, 304, 306, 308, and/or 310. Users operating client computing devices 302, 304, 306, 308, and/or 310 may in turn utilize one or more client applications to interact with server 314 to utilize the services provided by these components.

In the configuration depicted in FIG. 3, server 314 may include one or more components 320, 322 and 324 that implement the functions performed by server 314. These components may include software components that may be executed by one or more processors, hardware components, or combinations thereof. It should be appreciated that various different system configurations are possible, which may be different from distributed system 300. The embodiment shown in FIG. 3 is thus one example of a distributed system for implementing an embodiment system and is not intended to be limiting.

Users may use client computing devices 302, 304, 306, 308, and/or 310 for techniques for managing bastion service access in accordance with the teachings of this disclosure. A client device may provide an interface that enables a user of the client device to interact with the client device. The client device may also output information to the user via this interface. Although FIG. 3 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh, UNIX or UNIX-like operating systems, Linux or Linux-like operating systems such as Oracle® Linux and Google Chrome® OS) including various mobile operating systems (e.g., Microsoft Windows Mobile®, iOS®, Windows Phone®, Android™, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox gaming console with or without a Kinect® gesture input device, Sony PlayStation® system, Nintendo Switch™, and other devices), and the like. The client devices may be capable of executing various different applications such as various Internet-related apps, communication applications (e.g., e-mail applications, short message service (SMS) applications) and may use various communication protocols.

Network(s) 312 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 312 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth™, and/or any other wireless protocol), and/or any combination of these and/or other networks.

Server 314 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 314 can include one or more virtual machines running virtual operating systems, or other computing architectures involving virtualization such as one or more flexible pools of logical storage devices that can be virtualized to maintain virtual storage devices for the server. In various aspects, server 314 may be adapted to run one or more services or software applications that provide the functionality described in the foregoing disclosure.

The computing systems in server 314 may run one or more operating systems including any of those discussed above, as well as any commercially available server operating system. Server 314 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 314 may include one or more applications to analyze and consolidate data feeds and/or event updates received from users of client computing devices 302, 304, 306, 308, and/or 310. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 314 may also include one or more applications to display the data feeds and/or real-time events via one or more display devices of client computing devices 302, 304, 306, 308, and/or 310.

Distributed system 300 may also include one or more data repositories 316, 318. These data repositories may be used to store data and other information in certain aspects. For example, one or more of the data repositories 316, 318 may be used to store information for techniques for managing bastion service access. Data repositories 316, 318 may reside in a variety of locations. For example, a data repository used by server 314 may be local to server 314 or may be remote from server 314 and in communication with server 314 via a network-based or dedicated connection. Data repositories 316, 318 may be of different types. In certain aspects, a data repository used by server 314 may be a database, for example, a relational database, a container database, an Exadata® storage device, or other data storage and retrieval tool such as databases provided by Oracle Corporation and other vendors. One or more of these databases may be adapted to enable storage, update, and retrieval of data to and from the database in response to structured query language (SQL)-formatted commands.

In certain aspects, one or more of data repositories 316, 318 may also be used by applications to store application data. The data repositories used by applications may be of different types such as, for example, a key-value store repository, an object store repository, or a general storage repository supported by a file system.

In one embodiment, server 314 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 4:
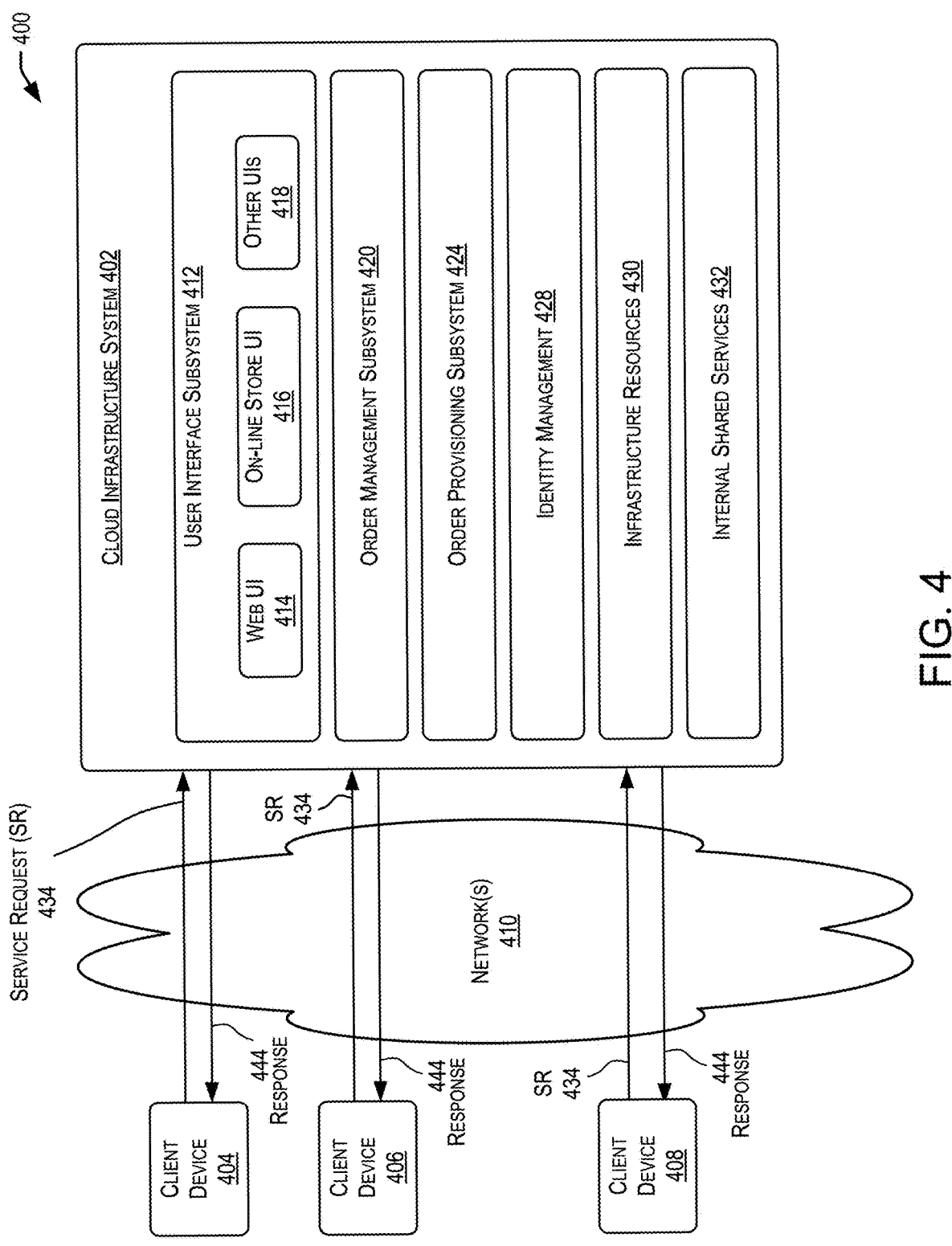
FIG. 4 is a simplified block diagram of one or more components of a system environment by which services provided by one or more components of an embodiment system may be offered as cloud services, in accordance with certain aspects.

FIG. 4 is a simplified block diagram of a cloud-based system environment in which manage bastion service access, in accordance with certain aspects. In the embodiment depicted in FIG. 4, cloud infrastructure system 402 may provide one or more cloud services that may be requested by users using one or more client computing devices 404, 406, and 408. Cloud infrastructure system 402 may comprise one or more computers and/or servers that may include those described above for server 312. The computers in cloud infrastructure system 402 may be organized as general purpose computers, specialized server computers, server farms, server clusters, or any other appropriate arrangement and/or combination.

Network(s) 410 may facilitate communication and exchange of data between clients 404, 406, and 408 and cloud infrastructure system 402. Network(s) 410 may include one or more networks. The networks may be of the same or different types. Network(s) 410 may support one or more communication protocols, including wired and/or wireless protocols, for facilitating the communications.

The embodiment depicted in FIG. 4 is only one example of a cloud infrastructure system and is not intended to be limiting. It should be appreciated that, in some other aspects, cloud infrastructure system 402 may have more or fewer components than those depicted in FIG. 4, may combine two or more components, or may have a different configuration or arrangement of components. For example, although FIG. 4 depicts three client computing devices, any number of client computing devices may be supported in alternative aspects.

The term cloud service is generally used to refer to a service that is made available to users on demand and via a communication network such as the Internet by systems (e.g., cloud infrastructure system 402) of a service provider.

Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 410 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation, such as database services, middleware services, application services, and others.

In certain aspects, cloud infrastructure system 402 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 402 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 402. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 402. Cloud infrastructure system 402 then performs processing to provide the services requested in the tenant's subscription order. Cloud infrastructure system 402 may be configured to provide one or even multiple cloud services.

Cloud infrastructure system 402 may provide the cloud services via different deployment models. In a public cloud model, cloud infrastructure system 402 may be owned by a third party cloud services provider and the cloud services are offered to any general public tenant, where the tenant can be an individual or an enterprise. In certain other aspects, under a private cloud model, cloud infrastructure system 402 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 402 and the services provided may be shared by several organizations in a related community. Various other models such as hybrids of the above mentioned models may also be used.

Client computing devices 404, 406, and 408 may be of different types (such as devices 302, 304, 306, and 308 depicted in FIG. 3) and may be capable of operating one or more client applications. A user may use a client device to interact with cloud infrastructure system 402, such as to request a service provided by cloud infrastructure system 402.

In some aspects, the processing performed by cloud infrastructure system 402 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 402 for determining the intent of an utterance. The data used for this analysis may include structured data (e.g., data stored in a database or structured according to a structured model) and/or unstructured data (e.g., data blobs (binary large objects)).

As depicted in the embodiment in FIG. 4, cloud infrastructure system 402 may include infrastructure resources 430 that are utilized for facilitating the provision of various cloud services offered by cloud infrastructure system 402. Infrastructure resources 430 may include, for example, processing resources, storage or memory resources, networking resources, and the like.

In certain aspects, to facilitate efficient provisioning of these resources for supporting the various cloud services provided by cloud infrastructure system 402 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 402 may itself internally use services 432 that are shared by different components of cloud infrastructure system 402 and which facilitate the provisioning of services by cloud infrastructure system 402. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 402 may comprise multiple subsystems. These subsystems may be implemented in software, or hardware, or combinations thereof. As depicted in FIG. 4, the subsystems may include a user interface subsystem 412 that enables users of cloud infrastructure system 402 to interact with cloud infrastructure system 402. User interface subsystem 412 may include various different interfaces such as a web interface 414, an online store interface 416 where cloud services provided by cloud infrastructure system 402 are advertised and are purchasable by a consumer, and other interfaces 418. For example, a tenant may, using a client device, request (service request 434) one or more services provided by cloud infrastructure system 402 using one or more of interfaces 414, 416, and 418. For example, a tenant may access the online store, browse cloud services offered by cloud infrastructure system 402, and place a subscription order for one or more services offered by cloud infrastructure system 402 that the tenant wishes to subscribe to. The service request may include information identifying the tenant and one or more services that the tenant desires to subscribe to.

In certain aspects, such as the embodiment depicted in FIG. 4, cloud infrastructure system 402 may comprise an order management subsystem (OMS) 420 that is configured to process the new order. As part of this processing, OMS 420 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 420 may then invoke the order provisioning subsystem (OPS) 424 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 402 may send a response or notification 444 to the requesting tenant to indicate when the requested service is now ready for use. In some instances, information (e.g., a link) may be sent to the tenant that enables the tenant to start using and availing the benefits of the requested services.

Cloud infrastructure system 402 may provide services to multiple tenants. For each tenant, cloud infrastructure system 402 is responsible for managing information related to one or more subscription orders received from the tenant, maintaining tenant data related to the orders, and providing the requested services to the tenant or clients of the tenant. Cloud infrastructure system 402 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 402 may provide services to multiple tenants in parallel. Cloud infrastructure system 402 may store information for these tenants, including possibly proprietary information. In certain aspects, cloud infrastructure system 402 comprises an identity management subsystem (IMS) 428 that is configured to manage tenant's information and provide the separation of the managed information such that information related to one tenant is not accessible by another tenant. IMS 428 may be configured to provide various security-related services such as identity services, such as information access management, authentication and authorization services, services for managing tenant identities and roles and related capabilities, and the like.

Figure 5:
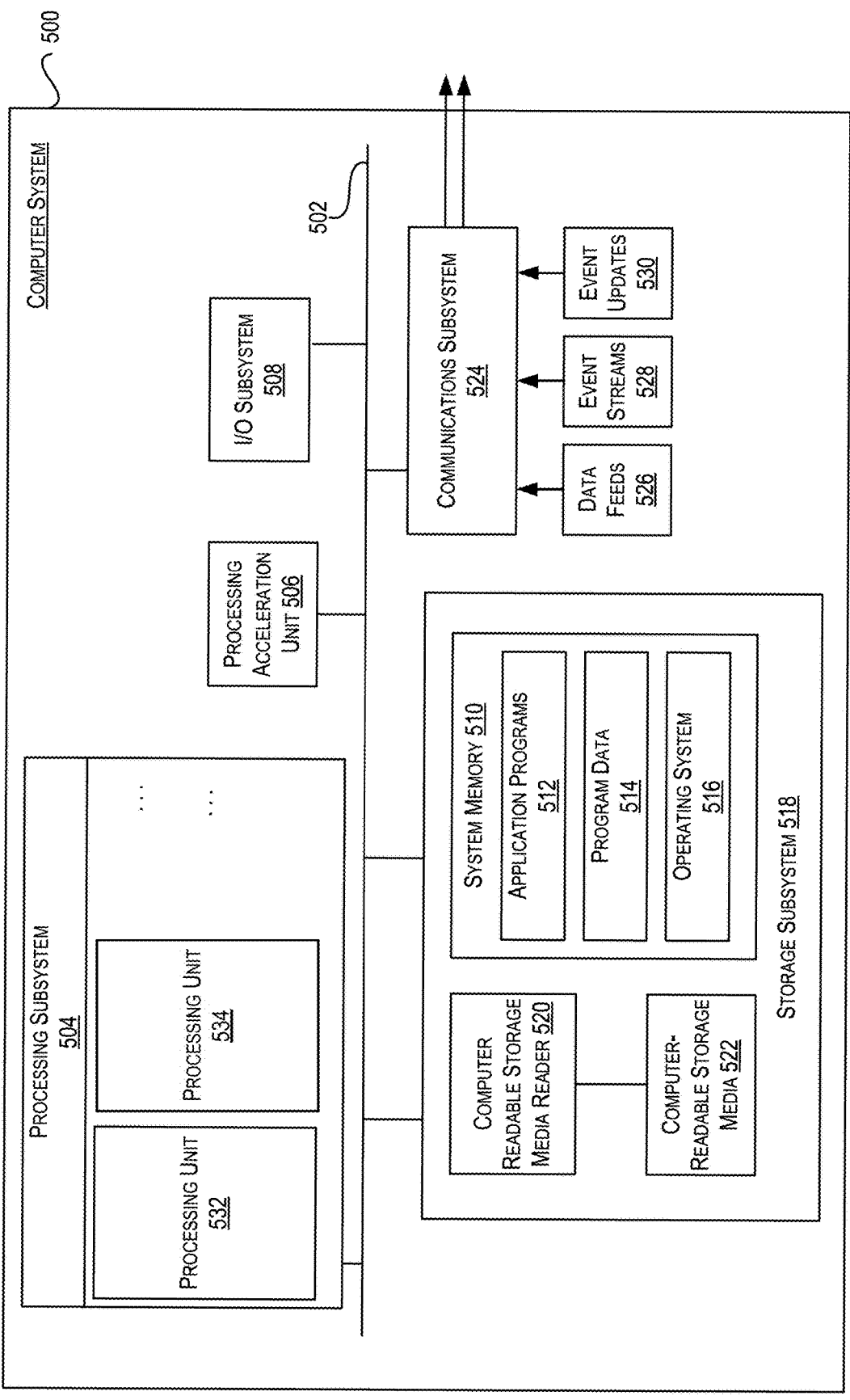
FIG. 5 illustrates an example computer system that may be used to implement certain aspects.

FIG. 5 illustrates an exemplary computer system 500 that may be used to implement certain aspects. As shown in FIG. 5, computer system 500 includes various subsystems including a processing subsystem 504 that communicates with a number of other subsystems via a bus subsystem 502. These other subsystems may include a processing acceleration unit 506, an I/O subsystem 508, a storage subsystem 518, and a communications subsystem 524. Storage subsystem 518 may include non-transitory computer-readable storage media including storage media 522 and a system memory 510.

Bus subsystem 502 provides a mechanism for letting the various components and subsystems of computer system 500 communicate with each other as intended. Although bus subsystem 502 is shown schematically as a single bus, alternative aspects of the bus subsystem may utilize multiple buses. Bus subsystem 502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 504 controls the operation of computer system 500 and may comprise one or more processors, application specific integrated circuits (ASICs), or field programmable gate arrays (FPGAs). The processors may be single core or multicore processors. The processing resources of computer system 500 can be organized into one or more processing units 532, 534, etc. A processing unit may include one or more processors, one or more cores from the same or different processors, a combination of cores and processors, or other combinations of cores and processors. In some aspects, processing subsystem 504 can include one or more special purpose co-processors such as graphics processors, digital signal processors (DSPs), or the like. In some aspects, some or all of the processing units of processing subsystem 504 can be implemented using customized circuits, such as application specific integrated circuits (ASICs), or field programmable gate arrays (FPGAs).

In some aspects, the processing units in processing subsystem 504 can execute instructions stored in system memory 510 or on computer readable storage media 522. In various aspects, the processing units can execute a variety of programs or code instructions and can maintain multiple concurrently executing programs or processes. At any given time, some or all of the program code to be executed can be resident in system memory 510 and/or on computer-readable storage media 522 including potentially on one or more storage devices. Through suitable programming, processing subsystem 504 can provide various functionalities described above. In instances where computer system 500 is executing one or more virtual machines, one or more processing units may be allocated to each virtual machine.

In certain aspects, a processing acceleration unit 506 may optionally be provided for performing customized processing or for off-loading some of the processing performed by processing subsystem 504 so as to accelerate the overall processing performed by computer system 500.

I/O subsystem 508 may include devices and mechanisms for inputting information to computer system 500 and/or for outputting information from or via computer system 500. In general, use of the term input device is intended to include all possible types of devices and mechanisms for inputting information to computer system 500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 500 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 518 provides a repository or data store for storing information and data that is used by computer system 500. Storage subsystem 518 provides a tangible non-transitory computer-readable storage medium for storing the basic programming and data constructs that provide the functionality of some aspects. Storage subsystem 518 may store software (e.g., programs, code modules, instructions) that when executed by processing subsystem 504 provides the functionality described above. The software may be executed by one or more processing units of processing subsystem 504. Storage subsystem 518 may also provide a repository for storing data used in accordance with the teachings of this disclosure.

Storage subsystem 518 may include one or more non-transitory memory devices, including volatile and non-volatile memory devices. As shown in FIG. 5, storage subsystem 518 includes a system memory 510 and a computer-readable storage media 522. System memory 510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 500, such as during start-up, may typically be stored in the ROM. The RAM typically contains data and/or program modules that are presently being operated and executed by processing subsystem 504. In some implementations, system memory 510 may include multiple different types of memory, such as static random access memory (SRAM), dynamic random access memory (DRAM), and the like.

By way of example, and not limitation, as depicted in FIG. 5, system memory 510 may load application programs 512 that are being executed, which may include various applications such as Web browsers, mid-tier applications, relational database management systems (RDBMS), etc., program data 514, and an operating system 516. By way of example, operating system 516 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 522 may store programming and data constructs that provide the functionality of some aspects. Computer-readable media 522 may provide storage of computer-readable instructions, data structures, program modules, and other data for computer system 500.

Software (programs, code modules, instructions) that, when executed by processing subsystem 504 provides the functionality described above, may be stored in storage subsystem 518. By way of example, computer-readable storage media 522 may include non-volatile memory such as a hard disk drive, a magnetic disk drive, an optical disk drive such as a CD ROM, digital video disc (DVD), a Blu-Ray disk, or other optical media. Computer-readable storage media 522 may include, but is not limited to, Zip drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 518 may also include a computer-readable storage media reader 520 that can further be connected to computer-readable storage media 522. Reader 520 may receive and be configured to read data from a memory device such as a disk, a flash drive, etc.

In certain aspects, computer system 500 may support virtualization technologies, including but not limited to virtualization of processing and memory resources. For example, computer system 500 may provide support for executing one or more virtual machines. In certain aspects, computer system 500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 500. Accordingly, multiple operating systems may potentially be run concurrently by computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to establish a communication channel to one or more client devices via the Internet for receiving and sending information from and to the client devices.

Communication subsystem 524 may support both wired and/or wireless communication protocols. For example, in certain aspects, communications subsystem 524 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 524 can provide wired network connectivity (e.g., Ethernet) in addition to or instead of a wireless interface.

Communication subsystem 524 can receive and transmit data in various forms. For example, in some aspects, in addition to other forms, communications subsystem 524 may receive input communications in the form of structured and/or unstructured data feeds 526, event streams 528, event updates 530, and the like. For example, communications subsystem 524 may be configured to receive (or send) data feeds 526 in real-time from users of social media networks and/or other communication services such as Twitter feeds, Facebook® updates, web feeds such as Rich Site Summary (RSS) feeds, and/or real-time updates from one or more third party information sources.

In certain aspects, communications subsystem 524 may be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to communicate data from computer system 500 to other computer systems or networks. The data may be communicated in various different forms such as structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 500 depicted in FIG. 5 is intended only as a specific example. Many other configurations having more or fewer components than the system depicted in FIG. 5 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
storing a first set of authorization policies of a first tenancy of a multi-tenant cloud infrastructure, wherein the first set of authorization policies authorizes a first set of one or more users associated with the first tenancy for bastion service creation and authorizes a second set of one or more users associated with a second tenancy for bastion service access, wherein the first set of one or more users comprises a first user from the first tenancy and the second set of one or more users comprises a second user from the second tenancy of the multi-tenant cloud infrastructure;
storing a second set of authorization policies of the second tenancy, wherein the second set of authorization policies authorizes the first set of one or more users to delete a portion of the second tenancy from which bastion sessions may be accessed and authorizes the second set of one or more users for bastion session creation in the second tenancy;
based on the first set of authorization policies, determining that the first user is authorized for bastion service creation in the first tenancy, and creating a bastion service in response to a request from the first user; wherein the bastion service is configured to use a recording destination that is not modifiable by the second user;
based on the second set of authorization policies, determining that the second user is authorized for bastion session creation from the bastion service, and using the bastion service to create a bastion session for securely accessing one or more resources of the first tenancy;

logging bastion session activity for the bastion session to the recording destination that is not modifiable by the second user, wherein the recording destination is accessible to one or more users other than the second user.

2. The computer-implemented method of claim 1, wherein the one or more resources accessible in the bastion session are in a first subnet of a first virtual cloud network of the first tenancy.

3. The computer-implemented method of claim 2, further comprising, based at least in part on a request from a third user, creating one or more other bastion sessions for securely accessing one or more other resources of a second subnet of a second virtual cloud network in the first tenancy; wherein the first subnet is different than the second subnet; wherein bastion session activity for the one or more other bastion sessions is logged to a recording destination that is accessible to one or more users other than the third user.

4. The computer-implemented method of claim 1, wherein the first set of authorization policies of the first tenancy further authorizes a third set of one or more users to delete a portion of the first tenancy from which bastion sessions may be accessed and further authorizes a fourth set of one or more users for bastion session creation in the first tenancy, and wherein the second set of authorization policies of the second tenancy further authorizes the third set of one or more users for bastion service creation and further authorizes the fourth set of one or more users for bastion service access; wherein the third set of one or more users comprises a third user from the second tenancy and the fourth set of one or more users comprises a fourth user from the first tenancy; the computer implemented method further comprising:
based on the first set of authorization policies and the second set of authorization policies, determining that the third user is authorized for bastion service creation in the second tenancy, and creating a second bastion service in response to a request from the third user; wherein the second bastion service specifies a second recording destination that is not modifiable by the fourth user;
based on the first set of authorization policies and the second set of authorization policies, determining that the fourth user is authorized for bastion session creation from the second bastion service, and using the second bastion service to create a second bastion session for securely accessing one or more resources of the second tenancy;
logging bastion session activity for the second bastion session to the second recording destination that is not modifiable by the fourth user, wherein the second recording destination is accessible to one or more users other than the fourth user.

5. The computer-implemented method of claim 1, wherein the second set of one or more users is associated with one or more IP address ranges, and wherein determining that the second user is authorized for bastion session creation from the bastion service comprises validating that a communication from the second user is within the one or more IP address ranges.

6. The computer-implemented method of claim 1, wherein the bastion session activity comprises one or more secure communications between the first tenancy and the portion of the second tenancy, the computer-implemented method further comprising:
monitoring one or more inputs or outputs from within the bastion session according to a configuration of the bastion service.

7. The computer-implemented method of claim 1, further comprising:

establishing a plurality of connections with a plurality of users of the bastion session;

enforcing one or more constraints on the bastion session based at least in part on one or more constraints specified by the bastion service; wherein resources are accessed by the plurality of users in the bastion session through the one or more constraints of the bastion service.

8. The computer-implemented method of claim 1, further comprising authenticating the first user to a first user session using a bearer token received according to a Security Assertion Markup Language (SAML) communication.

9. The computer-implemented method of claim 1, further comprising authenticating the second user to a second user session by issuing a Kerberos ticket to the second user encrypted using a server key; wherein the Kerberos ticket comprises a session key that is used for authentication of the second user to the second user session.

10. The computer-implemented method of claim 1, wherein logging the bastion session activity for the bastion session to the recording destination comprises storing the bastion session activity in an access-controlled storage container in a third tenancy, and wherein storing the bastion session activity in the access-controlled storage container triggers an automated analysis of the bastion session activity.

11. A computer-program product comprising one or more non-transitory machine-readable storage media, including stored instructions configured to cause a computing system to perform a set of actions including:

storing a first set of authorization policies of a first tenancy of a multi-tenant cloud infrastructure, wherein the first set of authorization policies authorizes a first set of one or more users associated with the first tenancy for bastion service creation and authorizes a second set of one or more users associated with a second tenancy for bastion service access, wherein the first set of one or more users comprises a first user from the first tenancy and the second set of one or more users comprises second user from a second tenancy of the multi-tenant cloud infrastructure;

storing a second set of authorization policies of the second tenancy, wherein the second set of authorization policies authorizes the first set of one or more users to delete a portion of the second tenancy from which bastion sessions may be accessed and authorizes the second set of one or more users for bastion session creation in the second tenancy;

based on the first set of authorization policies, determining that the first user is authorized for bastion service creation in the first tenancy, and creating a bastion service in response to a request from the first user; wherein the bastion service is configured to use a recording destination that is not modifiable by the second user;

based on the first set of authorization policies and the second set of authorization policies, determining that the second user is authorized for bastion session creation from the bastion service, and using the bastion service to create a bastion session for securely accessing one or more resources of the first tenancy;

logging bastion session activity for the bastion session to the recording destination that is not modifiable by the second user, wherein the recording destination is accessible to one or more users other than the second user.

12. The computer-program product of claim 11, wherein the one or more resources accessible in the bastion session are in a first subnet of a first virtual cloud network of the first tenancy, wherein the set of actions further includes:

based at least in part on a request from a third user, creating one or more other bastion sessions for securely accessing one or more other resources of a second subnet of a second virtual cloud network in the first tenancy; wherein the first subnet is different than the second subnet; wherein bastion session activity for the one or more other bastion sessions is logged to a recording destination that is accessible to one or more users other than the third user.

13. The computer-program product of claim 11, wherein the first set of authorization policies of the first tenancy further authorizes a third set of one or more users to delete a portion of the first tenancy from which bastion sessions may be accessed and further authorizes a fourth set of one or more users for bastion session creation in the first tenancy, and wherein the second set of authorization policies of the second tenancy further authorizes the third set of one or more users for bastion service creation and further authorizes the fourth set of one or more users for bastion service access; wherein the third set of one or more users comprises a third user from the second tenancy and the fourth set of one or more users comprises a fourth user from the first tenancy; wherein the set of actions further includes:

based on the first set of authorization policies and the second set of authorization policies, determining that the third user is authorized for bastion service creation in the second tenancy, and creating a second bastion service in response to a request from the third user; wherein the second bastion service specifies a second recording destination that is not modifiable by the fourth user;

based on the first set of authorization policies and the second set of authorization policies, determining that the fourth user is authorized for bastion session creation from the second bastion service, and using the second bastion service to create a second bastion session for securely accessing one or more resources of the second tenancy;

logging bastion session activity for the second bastion session to the second recording destination that is not modifiable by the fourth user, wherein the second recording destination is accessible to one or more users other than the fourth user.

14. The computer-program product of claim 11, wherein the second set of one or more users is associated with one or more IP address ranges, and wherein determining that the second user is authorized for bastion session creation from the bastion service comprises validating that a communication from the second user is within the one or more IP address ranges.

15. The computer-program product of claim 11, wherein logging the bastion session activity for the bastion session to the recording destination comprises storing the bastion session activity in an access-controlled storage container in a third tenancy, and wherein storing the bastion session activity in the access-controlled storage container triggers an automated analysis of the bastion session activity.

16. A system comprising:

one or more processors;

one or more non-transitory computer-readable media storing instructions, which, when executed by the system, cause the system to perform a set of actions including:

storing a first set of authorization policies of a first tenancy of a multi-tenant cloud infrastructure, wherein the first set of authorization policies authorizes a first set of one or more users associated with the first tenancy for bastion service creation and authorizes a second set of one or more users associated with the second tenancy for bastion service access, wherein the first set of one or more users comprises a first user from the first tenancy and the second set of one or more users comprises a second user from a second tenancy of the multi-tenant cloud infrastructure;

storing a second set of authorization policies of the second tenancy of the multi- tenant cloud infrastructure, wherein the second set of authorization policies authorizes the first set of one or more users to delete a portion of the second tenancy from which bastion sessions may be accessed and authorizes the second set of one or more users for bastion session creation in the second tenancy;

based on the first set of authorization policies, determining that the first user is authorized for bastion service creation in the first tenancy, and creating a bastion service in response to a request from the first user; wherein the bastion service is configured to use a recording destination that is not modifiable by the second user;

based on the second set of authorization policies, determining that the second user is authorized for bastion session creation from the bastion service, and using the bastion service to create a bastion session for securely accessing one or more resources of the first tenancy;

logging bastion session activity for the bastion session to the recording destination that is not modifiable by the second user, wherein the recording destination is accessible to one or more users other than the second user.

17. The system of claim 16, wherein the one or more resources accessible in the bastion session are in a first subnet of a first virtual cloud network of the first tenancy, wherein the set of actions further includes:

based at least in part on a request from a third user, creating one or more other bastion sessions for securely accessing one or more other resources of a second subnet of a second virtual cloud network in the first tenancy; wherein the first subnet is different than the second subnet; wherein bastion session activity for the one or more other bastion sessions is logged to a recording destination that is accessible to one or more users other than the third user.

18. The system of claim 16, wherein the first set of authorization policies of the first tenancy further authorizes a third set of one or more users to delete a portion of the first tenancy from which bastion sessions may be accessed and further authorizes a fourth set of one or more users for bastion session creation in the first tenancy, and wherein the second set of authorization policies of the second tenancy further authorizes the third set of one or more users for bastion service creation and further authorizes the fourth set of one or more users for bastion service access; wherein the third set of one or more users comprises a third user from the second tenancy and the fourth set of one or more users comprises a fourth user from the first tenancy; wherein the set of actions further includes:

based on the first set of authorization policies and the second set of authorization policies, determining that the third user is authorized for bastion service creation in the second tenancy, and creating a second bastion service in response to a request from the third user; wherein the second bastion service specifies a second recording destination that is not modifiable by the fourth user;

based on the first set of authorization policies and the second set of authorization policies, determining that the fourth user is authorized for bastion session creation from the second bastion service, and using the second bastion service to create a second bastion session for securely accessing one or more resources of the second tenancy;

logging bastion session activity for the second bastion session to the second recording destination that is not modifiable by the fourth user, wherein the second recording destination is accessible to one or more users other than the fourth user.

19. The system of claim 16, wherein the second set of one or more users is associated with one or more IP address ranges, and wherein determining that the second user is authorized for bastion session creation from the bastion service comprises validating that a communication from the second user is within the one or more IP address ranges.

20. The system of claim 16, wherein logging the bastion session activity for the bastion session to the recording destination comprises storing the bastion session activity in an access-controlled storage container in a third tenancy, and wherein storing the bastion session activity in the access-controlled storage container triggers an automated analysis of the bastion session activity.

* * * * *